United States Patent
Katayama et al.

(10) Patent No.: US 8,025,273 B2
(45) Date of Patent: Sep. 27, 2011

(54) LIQUID-FILLED ANTI-VIBRATION MOUNTING DEVICE

(75) Inventors: Minoru Katayama, Kurashiki (JP); Katsutoshi Ohta, Kurashiki (JP); Sumio Uchida, Kurashiki (JP); Yoshiharu Yamamoto, Kurashiki (JP)

(73) Assignee: Kurashiki Kako Co., Ltd., Okayama (JP)

(*) Notice: Subject to any disclaimer, the term of this patent is extended or adjusted under 35 U.S.C. 154(b) by 975 days.

(21) Appl. No.: 11/939,904

(22) Filed: Nov. 14, 2007

(65) Prior Publication Data

US 2008/0290573 A1    Nov. 27, 2008

(30) Foreign Application Priority Data

May 22, 2007 (JP) ................. 2007-135811
May 28, 2007 (JP) ................. 2007-140587

(51) Int. Cl.
*F16F 5/00* (2006.01)
(52) U.S. Cl. ............... 267/140.12; 267/140.13
(58) Field of Classification Search ........... 267/140.11–140.15, 292
See application file for complete search history.

(56) References Cited

U.S. PATENT DOCUMENTS

| | | | |
|---|---|---|---|
| 2002/0171186 A1* | 11/2002 | Baudendistel et al. | 267/140.15 |
| 2003/0168789 A1* | 9/2003 | Kries et al. | 267/140.13 |
| 2006/0066016 A1* | 3/2006 | Hasegawa et al. | 267/140.13 |

FOREIGN PATENT DOCUMENTS

| | | |
|---|---|---|
| JP | 63-9537 | 1/1988 |
| JP | 1-224544 A | 9/1989 |
| JP | 02-304230 | 12/1990 |
| JP | 2006-38016 A | 2/2006 |
| JP | 2006-38017 A | 2/2006 |
| JP | 2006-207629 A | 8/2006 |
| JP | 2006-207630 A | 8/2006 |

\* cited by examiner

*Primary Examiner* — Bradley King
*Assistant Examiner* — Nicholas J Lane
(74) *Attorney, Agent, or Firm* — Roberts Mlotkowski Safran & Cole, P.C.

(57) ABSTRACT

In a liquid-filled anti-vibration mounting device suitable such as for an engine mount, an accommodation room containing a rubber movable plate is formed inside a partition member partitioning a liquid chamber into a pressure receiving chamber and a balancing chamber. The partition member includes a pair of division walls, one adjoining the pressure receiving chamber and the other adjoining the balancing chamber. Each division wall is formed with a plurality of communication holes. The communication holes are arranged to undulate at least a portion of the movable plate towards the peripheral edge thereof at specified circumferential intervals or greater by the action of the liquid pressure through the communication holes. The movable plate thus deformed, particularly its portion towards the peripheral edge, has a small area to come into contact with the division walls at a time, which effectively disperses and lessens a shock due to contact.

13 Claims, 13 Drawing Sheets

LIQUID-FILLED ANTI-VIBRATION MOUNTING DEVICE

BACKGROUND OF THE INVENTION (a) Field of the Invention

This invention relates to liquid-filled anti-vibration mounting device used, for example, in motor vehicles, and particularly relates to the structure for restraining the production of abnormal noise due to abutment of a movable plate against a partition member in a liquid-filled anti-vibration mounting device in which the movable plate is contained in the partition member in a liquid chamber.

(b) Description of the Related Art

An example of known liquid-filled anti-vibration mounting devices of such kind is an engine mount for a motor vehicle. The engine mount has a basic structure in which a rubber elastic material is interposed between a mounting member for an engine and a support member for a vehicle body, a liquid chamber is formed between both the members to change its volume with deformation of the rubber elastic material and partitioned into a pressure receiving chamber and a balancing chamber and an orifice passage is provided for communicating the pressure receiving chamber with the balancing chamber.

The orifice passage is tuned to relatively low-frequency and large-amplitude vibrations, such as vibrations at engine start-up, jerky vibrations at gear change or shaking, and such vibrations to be input to the engine mount can be effectively damped by a resonance (liquid column resonance) generated when the liquid flows via the orifice passage between the pressure receiving chamber and the balancing chamber.

The partition member partitioning the liquid chamber into the pressure receiving chamber and the balancing chamber is composed of a pair of division walls disposed with a specified distance between them, one division wall adjoining the pressure receiving chamber and the other adjoining the balancing chamber. An accommodation room containing a movable plate is defined between the pair of division walls. The pair of division walls are each formed with communication holes, the communication holes in one of the division walls communicate the accommodation room with the pressure receiving chamber and the communication holes in the other division wall communicate the accommodation room with the balancing chamber. When a change in the liquid pressure in the liquid chamber is transmitted via the communication holes to the accommodation room, the movable plate moves to absorb the change.

Specifically, when vibrations are input to the engine mount with such a relatively high frequency and a small amplitude that the orifice passage may be clogged, changes in the liquid pressure in the pressure receiving chamber due to the vibrations are transmitted via the communication holes in the associated division wall to the accommodation room and the movable plate in the accommodation room vibrates in synchronization with the changes in the liquid pressure to absorb the changes. On the other hand, when relatively low-frequency and large-amplitude vibrations are input to the engine mount as described above, the movable plate responding to changes in liquid pressure due to the vibrations is pressed against the associated division wall to close the communication holes.

When the movable plate moves in the accommodation room in the partition member as described above, a shock occurs upon abutment against the division wall and is transmitted to the vehicle body, which may produce abnormal noise in the passenger compartment. Such abnormal noise, though its magnitude differs depending upon the vibration transmission characteristics of the vehicle body, can be reduced by lessening the shock.

To attain this, for example, in an engine mount disclosed in Published Japanese Patent Application No. 2006-38016, each surface of the movable plate is formed with a large number of dimples so that upon abutment against the facing division wall (referred to as the top plate or the bottom plate in the document), voids can be locally created by the dimples. Thus, the contact area of the movable plate with the division wall can be reduced to lessen a shock due to the abutment.

In another engine mount disclosed in Published Japanese Patent Application No. 2006-207630, a set of communication holes (referred to as slot openings in the document) in each division wall are offset in a radial direction, or towards a lateral side, with respect to the center of the movable plate. When a liquid pressure acts through the communication holes on the movable plate, the movable plate is radially inclined and thereby brought into gradual contact with the division wall with its lateral side end first and the rest delayed. Thus, the shock due to the contact can be dispersed in a time-shared manner and thereby eased.

PROBLEMS TO BE SOLVED BY THE INVENTION

However, even if the movable plate is formed with dimples as in the former conventional engine mount (Published Japanese Patent Application No. 2006-38016), this is not good enough to lessen the shock due to abutment against the division wall and leaves room for further reduction of abnormal noise in the passenger compartment. Specifically, in the former conventional engine mount, the movable plate has dimples only in a portion of each surface towards the center and no dimples in a portion thereof towards the peripheral edge. Therefore, when the portion of each surface towards the peripheral edge abuts against each division wall, its area in contact with the division wall at a time will be relatively large.

If a set of communication holes are offset in a radial direction or towards a lateral side as in the latter conventional engine mount (Published Japanese Patent Application No. 2006-207630), a region of each division wall opposite to the set of communication holes has only a small number of communication holes. This may provide shortage in the liquid pressure required to push the movable plate against each division wall, thereby causing liquid leakage, as disclosed in Paragraphs 0062 and 0063 in the document.

In respect of this problem, Paragraph 0064 and FIG. 7 in the document describes the provision of auxiliary openings in the region of each division wall opposite to the set of communication holes. In this case, however, the liquid pressure acts also through these openings, which may impair the primary function of inclining the movable plate.

In view of the foregoing problems, an object of the present invention is to effectively disperse a shock due to contact of the movable plate with each division wall and ease it by contriving arrangements of communication holes in each division wall to reduce the area of the movable plate, particularly its portion towards the peripheral edge, in contact with the division wall at a time.

SUMMARY OF THE INVENTION

To attain the above object, a liquid-filled anti-vibration mounting device according to the present invention is configured so that upon action of a liquid pressure on the movable plate through communication holes in each division wall, at least a portion of the movable plate towards the peripheral edge thereof is deformed, by the action of the liquid pressure, to circumferentially undulate and thereby disperse a shock to the division wall.

Specifically, a first aspect of the invention is directed to a liquid-filled anti-vibration mounting device including a mounting member to be mounted to an object to be supported by the mounting member, a support member supporting the mounting member through a rubber elastic material, a liquid chamber formed between the mounting member and the support member to change the volume with deformation of the rubber elastic material, a partition member partitioning the liquid chamber into a pressure receiving chamber and a balancing chamber and an orifice passage communicating the pressure receiving chamber and the balancing chamber with each other, the partition member containing a rubber movable plate in an accommodation room formed inside the partition member and having a plurality of communication holes formed therein to communicate the accommodation room with the pressure receiving chamber and the balancing chamber, the movable plate being movable to absorb changes in the liquid pressures of the pressure receiving chamber and the balancing chamber.

Furthermore, the partition member includes a pair of division walls that defines the accommodation room therebetween, one division wall adjoining the pressure receiving chamber and the other adjoining the balancing chamber, and the plurality of communication holes are formed in the pair of division walls and arranged in a specified pattern so that upon action of a liquid pressure through the communication holes on the movable plate, at least a portion of the movable plate towards the peripheral edge thereof undulates at specified circumferential intervals or greater by the action of the liquid pressure.

With the above configuration, when relatively low-frequency and large-amplitude vibrations are input to the anti-vibration mounting device to relatively largely change the relative position of the mounting member and the support member, the volume of the pressure receiving chamber changes with deformation of the rubber elastic material to provide changes in the liquid pressure. With changes in the liquid pressure, the liquid flows back and forth through the orifice passage between the pressure receiving chamber and the balancing chamber. This flow resistance of the liquid can effectively absorb and damp the vibrations.

During the time, the changes in the liquid pressure in the pressure receiving chamber act also on the accommodation room through the communication holes formed in the division wall of the partition member adjoining the pressure receiving chamber. However, since in the accommodation room the movable plate responding to the changes in the liquid pressure is pushed against the division wall adjoining the balancing chamber to close the communication holes in the same division wall, the liquid does not flow through these communication holes from the accommodation room into the balancing chamber, i.e., does not flow from the pressure receiving chamber into the balancing chamber. Therefore, the liquid flow through the orifice passage can be secured.

When, in the course of contact (abutment) of the movable plate responding to the changes in the liquid pressure of the pressure receiving chamber with (against) the division wall adjoining the balancing chamber, at least the portion of the movable plate towards the peripheral edge thereof deforms to circumferentially undulate by the action of the liquid pressure through the communication holes, the portion of the movable plate towards the peripheral edge comes into contact with the division wall adjoining the balancing chamber, starting with its parts close to the division wall, i.e., its largely undulating parts, and the undulating parts then squash and deform to gradually increase the contact region of the movable plate with the division wall.

In other words, the portion of the movable plate towards the peripheral edge has a very small area to come into contact with the division wall at a time, so that the shock to the division wall is dispersed in a time-shared manner and thereby eased. Particularly, if the portion of the movable plate towards the peripheral edge undulates at relatively large intervals, i.e., relatively largely undulates, the time taken to disperse the shock is accordingly extended to lower the peak of vibration transmissibility to the vehicle body. Therefore, abnormal noise in the passenger compartment can be well reduced.

In order to deform the movable plate in the above manner, preferably, the movable plate is approximately circular, the communication holes in at least one of the pair of division walls are arranged concentrically in two or more circumferential rows with respect to the center of the movable plate, and out of the communication holes in the at least one of the pair of division walls, at least the outermost circumferential row of communication holes are arranged at specified circumferential intervals or greater to have a total circumferential opening length shorter than the total circumferential length of non-opening sections on the same circumference (second and eleventh aspects of the invention).

When at least the outermost circumferential row of communication holes are arranged at specified circumferential intervals or greater, out of at least the portion of the movable plate located towards the peripheral edge thereof and corresponding to at least the outermost circumferential row of communication holes, parts close to and facing the communication holes are largely deformed by a strong influence of the liquid pressure. Thus, the portion of the movable plate towards the peripheral edge deforms to undulate generally at circumferential intervals each corresponding to the distance between each pair of circumferentially adjacent communication holes.

More preferably, the communication holes in at least one of the pair of division walls are arranged in a radial pattern with respect to the center of the movable plate and at approximately regular, specified circumferential intervals or greater (fifth and twelfth aspects of the invention). Thus, the whole of the movable plate, including not only the portion towards the peripheral edge but also the portion towards the center, can be circumferentially undulated. This is advantageous in largely undulating the portion of the movable plate towards the peripheral edge and enables the shock to the division wall to be dispersed not only by the portion of the movable plate towards the peripheral edge but also by the portion thereof towards the center.

The greater the intervals of the circumferentially spaced-apart communication holes, the more advantageous it becomes to largely undulate the movable plate. However, on the other hand, it becomes more difficult to secure the total open area of the communication holes in a limited space and the dynamic spring constant becomes higher. In view of the balance between the deformability and the open area, the circumferential intervals of the communication holes are preferably within the range of central angles of 36 to 90 degrees both inclusive (third and sixth aspects of the invention).

Specifically, the distance between each pair of circumferentially adjacent communication holes is, for example, a central angle of 36 degrees when the whole circumference is divided into ten equal segments, a central angle of 40 degrees when the whole circumference is divided into nine equal segments, or a central angle of 45 degrees when the whole circumference is divided into eight equal segments. However, in view of the above balance, the distance is more preferably within the range of central angles of 40 to 72 degrees both inclusive and particularly preferably 45 degrees (eight equal segments), approximately 51.4 degrees (seven equal segments) or 60 degrees (six equal segments).

Furthermore, the communication holes relatively close to the peripheral edge of the at least one of the pair of division walls preferably have a relatively small open area (fourth and seventh aspects of the invention), or the communication holes in the division wall adjoining the pressure receiving chamber and the communication holes in the division wall adjoining the balancing chamber are preferably arranged with respect to the center of the movable plate (an eighth aspect of the invention). Thus, the influence of the liquid pressure on the portion of the movable plate towards the center thereof becomes relatively strong, which is advantageous in lessening the shock at the portion of the movable plate towards the peripheral edge thereof.

Furthermore, at least one of the pair of division walls preferably includes a plurality of dents facing the accommodation room with one dent between each pair of circumferentially adjacent communication holes (a ninth aspect of the invention).

Specifically, when, in the course of contact (abutment) of the movable plate with (against) the at least one division wall as described previously, at least the portion of the movable plate towards the peripheral edge thereof deforms to circumferentially undulate and its relatively largely deformed parts first come into contact with the division wall, the liquid between the division wall and the remaining parts of the movable plate to come late into contact with the division wall acts like a cushion. Furthermore, if the dents are formed in the division wall to correspond to the parts of the movable plate which will come late into contact with the division wall, the liquid in the dents further secures the cushion effect.

More preferably, the dents are formed in the division wall with one dent at the midpoint between each pair of circumferentially adjacent communication holes. In this case, the dents and the communication holes are alternately arranged at circumferentially equal intervals (a tenth aspect of the invention). Thus, the dents are located corresponding to, out of the undulating portion of the movable plate towards the peripheral edge, the latest parts to come into contact with the division wall. This provides the most effective cushion effect of the liquid in the dents.

When the communication holes are arranged in a radial pattern, this arrangement may not allow sufficient space to form a dent between each pair of adjacent communication holes in the inner circumferential rows. In this case, dents are formed in the division wall, one for each region between each two adjacent communication holes at least in the outermost circumferential row.

Furthermore, preferably, a rubber layer is formed on the surface of the at least one of the pair of division walls facing the accommodation room and the plurality of dents are formed in the rubber layer (a thirteenth aspect of the invention). Thus, shocks can be lessened by the rubber layer formed on the division wall surface facing the movable plate and the dents can be easily formed during the molding of the rubber layer.

A large shock acting on the division wall owing to the abutment of the movable plate as described previously occurs, in many cases, when vibrations input to the anti-vibration mounting device rapidly increases the liquid pressure in the pressure receiving chamber and the movable plate accordingly abuts against the division wall adjoining the balancing chamber. Therefore, the division wall adjoining the balancing chamber preferably has a smaller total open area of the communication holes formed therein than the division wall adjoining the pressure receiving chamber (a fourteenth aspect of the invention).

Thus, when the movable plate moves towards the balancing chamber by the increase in the liquid pressure in the pressure receiving chamber, the liquid pushed by the movable plate becomes difficult to pass through the accommodation room into the balancing chamber. This increases the resistance to the movement of the movable plate and accordingly eases the shock upon contact of the movable plate with the division wall. Specifically, for example, the communication holes towards the balancing chamber are made smaller in size than those towards the pressure receiving chamber or the number of the communication holes towards the pressure receiving chamber is made larger than that of the communication holes towards the balancing chamber.

Furthermore, a raised portion is preferably formed on the portion of the movable plate towards the center thereof to first come into contact with the division wall, thereby lessening the shock due to contact of the portion of the movable plate towards the peripheral edge. For example, at least the surface of the movable plate towards the balancing chamber has an annular ridge formed to across the communication holes and the dents upon contact with the facing division wall (a fifteenth aspect of the invention).

Thus, the annular ridge comes into contact with the division wall only at sections between circumferentially adjacent communication holes and dents, which reduces the shock due to the contact. In addition, even if the position of the movable plate circumferentially changes, the contact area of the annular ridge does not change. Therefore, the magnitude of shock does not change owing to variations in the assembly of the movable plate, which is advantageous in restraining abnormal noise in the passenger compartment to a certain level or below it.

Furthermore, when at least the division wall adjoining the balancing chamber is provided at the surface facing the accommodation room with an annular region having no communication holes and no dents, the surface of the movable plate towards the balancing chamber may include projections formed at circumferential intervals to correspond to the annular region (a sixteenth aspect of the invention). The projections thus formed at circumferential intervals have a small area to come into contact with the division wall at a time and, like the annular ridge, their contact area with the division wall does not change even if the position of the movable plate circumferentially changes.

To sum up, according to the anti-vibration mounting device of the invention, where a plurality of communication holes are formed in each of a pair of division walls that define an accommodation room containing a rubber movable plate, one division wall adjoining a pressure receiving chamber and the other adjoining a balancing chamber, the communication holes in at least one of the pair of division walls are arranged in a specified pattern to undulate at least a portion of the movable plate towards the peripheral edge thereof at specified circumferential intervals or greater by the action of the liquid pressure through the communication holes. Therefore, the area of the portion of the movable plate towards the peripheral edge to come into contact with the division wall at a time can be significantly reduced as compared to the conventional techniques, whereby a shock due to contact can be dispersed in a time-shared manner and thereby eased.

Furthermore, where dents are formed in the division wall, one between each pair of circumferentially adjacent communication holes, the liquid between the division wall and the parts of the movable plate to come late into contact with the division wall provides a sufficient cushion effect, which can also ease the shock due to contact.

By easing the shock in the above manner and thereby significantly lowering the peak of vibration transmissibility to the vehicle body, abnormal noise in the passenger compartment can be well reduced.

DETAILED DESCRIPTION OF THE INVENTION

Hereinafter, embodiments of the invention will be described in detail with reference to the drawings. Note that the following description of the preferred embodiments is merely illustrative in nature and is not intended to limit the scope, applications and use of the invention.

Embodiment 1

FIG. 1 shows an anti-vibration mounting device according to an embodiment of the invention which is applied to an engine mount A for a motor vehicle. The engine mount A is interposed between an unshown power plant of the vehicle and an unshown vehicle body and configured to bear the load of the power plant and to absorb or damp vibrations from the power plant to restrain transmission of the vibrations to the vehicle body.

Figure 1A:
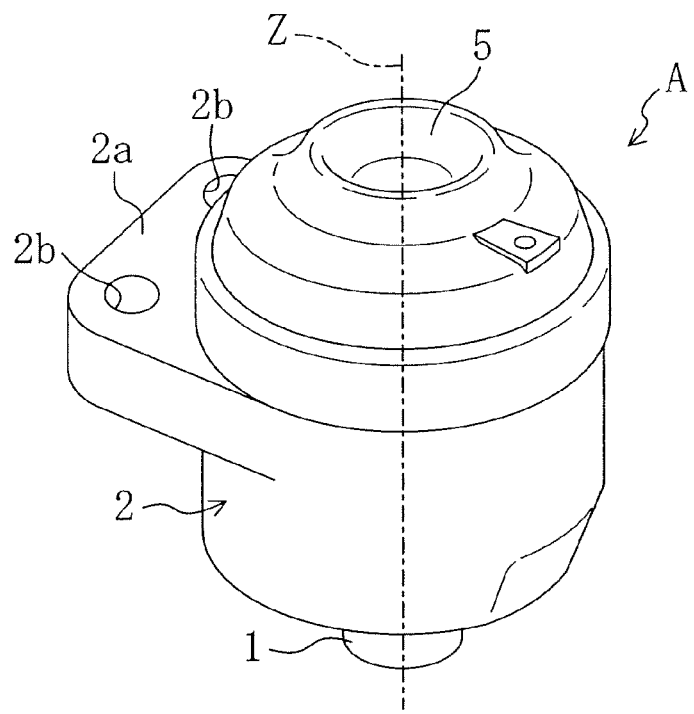
FIG. 1A is a perspective view showing the appearance of an engine mount according to Embodiment 1 of the invention.
Figure 1B:
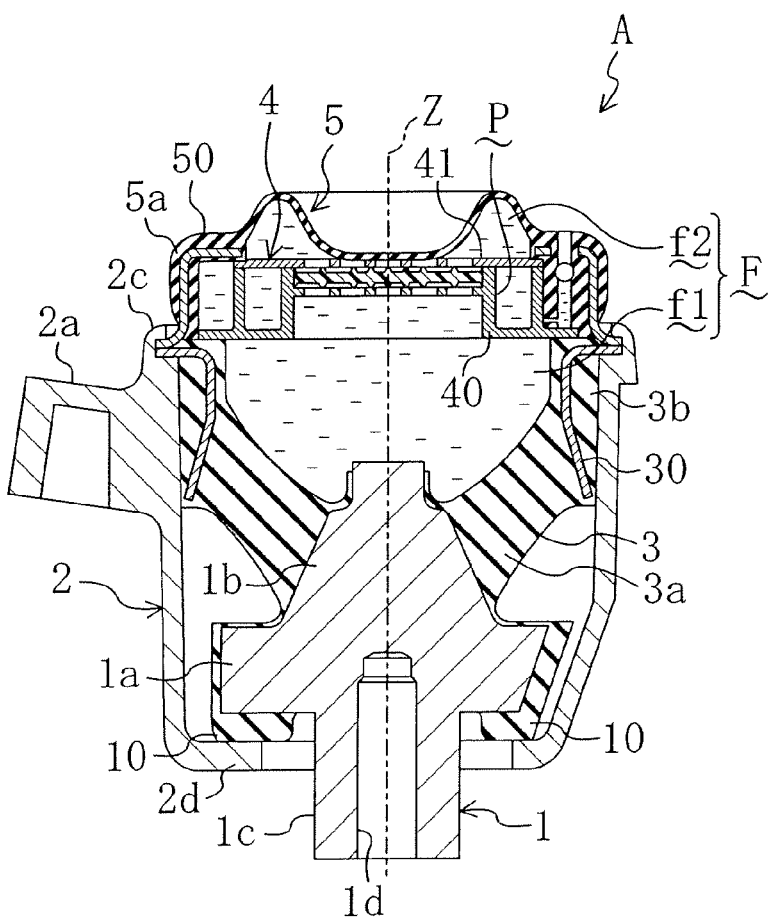
FIG. 1B is a longitudinal cross-sectional view showing the internal structure of the engine mount.

As shown in an exterior view in FIG. 1A and in a longitudinal cross-sectional view in FIG. 1B, the engine mount A of this embodiment includes a connecting fitting 1 (support member) which is to be connected to the vehicle body by an unshown bracket, and a cylindrical housing 2 surrounding the outer periphery of the connecting fitting 1 with a distance between them. The connecting fitting 1 extends beyond the lower end of the housing 2 and is connected to the housing 2 through a rubber elastic material 3 so as to be changeable in position in a direction of the axis Z of the housing 2.

Specifically, the connecting fitting 1 includes a flange 1a extending radially outwardly from substantially the middle thereof in a vertical direction, which coincides with the axial direction Z of the housing 2, an upwardly tapered part 1b extending from the top of the flange 1a and a shaft 1c extending from the bottom of the flange 1a to fit the bracket thereon from the vehicle body side. The shaft 1c has a bolt hole 1d opening at its bottom end face. The flange 1a is covered with a relatively thick rubber layer 10 to function as a stopper.

The housing 2 has a plate-shaped mounting part 2a extending from a part of its outer periphery close to its top end. The mounting part 2a has two through holes 2b and 2b formed in a direction of the thickness to receive bolts (not shown) and is configured to be mounted on the power plant by the bolts, such as through a bracket. In other words, in the engine mount A shown in FIG. 1, the housing 2 serves also as a mounting member for the power plant, which is an object to be supported by the housing 2, and is supported through the rubber elastic material 3 to the connecting fitting 1 located below.

As shown in FIG. 1, the rubber elastic material 3 has the general shape of a downwardly tapered cone and connects an upper part of the inner periphery of the housing 2 to an upper part of the outer periphery of the connecting fitting 1. Specifically, the rubber elastic material 3 includes a thick main spring part 3a vulcanized at the lower end onto the tapered part 1b of the connecting fitting 1 to cover it and extending obliquely upward while radially expanding from the tapered part 1b, and a cylindrical part 3b overlapping with an upper part of the main spring part 3a and continuously upwardly extending from it. The outer periphery of the cylindrical part 3b is adhered to the inner periphery of the housing 2. The cylindrical part 3b includes a reinforcing fitting 30 embedded therein over the entire circumference. The reinforcing fitting 30 has a flange bent radially outward from the upper end thereof and extending beyond the outer periphery of the cylindrical part 3b in the vicinity of the upper end of the outer periphery.

The rubber elastic material 3 is formed with a upwardly opening hollow. An orifice disk 4 and a rubber diaphragm 5 are placed to close the opening. A part of the diaphragm 5 towards the outer periphery thereof is a relatively thick cylindrical part 5a covering the entire outer periphery of the orifice disk 4 and also includes a reinforcing fitting 50 embedded therein over the entire circumference. The reinforcing fitting 50 has a flange bent radially outward from the lower end thereof and extending beyond the outer periphery of the cylindrical part 5a in the vicinity of the lower end of the outer periphery.

The flange of the reinforcing fitting 50 extending in the vicinity of the lower end of the cylindrical part 5a of the diaphragm 5 is overlaid on the flange of the reinforcing fitting 30 in the rubber elastic material 3 and both the flanges are crimped to each other at the top end of the housing 2 by an annular bent part 2c of the housing 2. Thus, the diaphragm 5 is fixed to the upper end of the housing 2 to enclose the hollow of the rubber elastic material 3 and form a liquid chamber F which is filled with a liquid, such as ethylene glycol.

The liquid chamber F is provided for absorbing and damping vibrations input from the power plant to the rubber elastic material 3 and its interior is partitioned into upper and lower chambers by the orifice disk 4. The lower chamber as viewed in FIG. 1B is a pressure receiving chamber f1 which changes its volume with the deformation of the rubber elastic material 3 due to input vibrations to change the liquid pressure. The upper chamber as viewed in FIG. 1B is a balancing chamber f2 which increases or decreases its volume with the deformation of the diaphragm 5 and thereby absorbs changes in the volume of the pressure receiving chamber f1.

The pressure receiving chamber f1 and the balancing chamber f2 are communicated with each other through an orifice passage P, although described in detail later, formed in a portion of the orifice disk 4 towards the outer periphery thereof. Furthermore, both the chambers f1 and f2 are configured so that when relatively low-frequency and large-amplitude vibrations to which the orifice passage P is tuned are input to the engine mount A, the liquid flows via the orifice passage P between the pressure receiving chamber f1 and the balancing chamber f2 and a resonance (liquid column resonance) generated during the liquid flow effectively damps the vibrations to be input to the engine mount A.

FIG. 1 shows the engine mount A in an unloaded state in which the static load of the power plant does not act at all on the engine mount A. Therefore, in this state, the rubber layer 10 under the flange 1a of the connecting fitting 1 is in contact with the flange 2d of the housing 2. However, when the engine mount A is mounted on the vehicle body to support the power plant so that a static load of 1 G of the power plant is applied thereto, the rubber elastic material 3 bows to displace the housing 2 downward so that a certain clearance is created between the rubber layer 10 and the flange 2d, although not shown here.

Structure of Orifice Disk

Next, a detailed description is given of the structure of the orifice disk 4 in the engine mount A, which is a feature of the invention. As described previously, this embodiment uses the orifice disk 4 as a partition member partitioning the liquid chamber F into the pressure receiving chamber f1 and the balancing chamber f2. The orifice disk 4, as shown in the enlarged views in FIGS. 2 and 3, comprises a combination of a body member 40 (hereinafter, also referred to as an orifice disk body 40) and a lid member 41 and has the general shape of a relatively thick circular disk.

The body member 40 is made, for example, of metal (or may be made of resin) and formed so that approximately cylindrical, inner and outer vertical walls 40b and 40c stand on an approximately circular-disk-shaped bottom plate 40a. The inner periphery of the inner vertical wall 40b defines an upwardly opening recess R of circular cross section and the outer periphery of the inner vertical wall 40b defines, together with the outer vertical wall 40c, a groove p1 upwardly opening substantially over the entire circumference of the inner vertical wall 40b. The lid member 41 is assembled with the body member 40 to cover the recess R and the groove p1 from above, whereby the recess R constitutes an accommodation room (hereinafter, referred to as an accommodation room R) for accommodating a movable plate 42 and the groove p1 constitutes an inner part of the orifice passage P.

As shown in FIG. 1B, with the outer periphery of the orifice disk 4 covered with the cylindrical part 5a of the diaphragm 5, an annular passage constituting an outer part of the orifice passage P is defined between the inner periphery of the cylindrical part 5a and the outer vertical wall 40c of the orifice disk body 40. One end of the outer part of the orifice passage P opens into the pressure receiving chamber f1 through a slot 40d (shown only in FIG. 3) formed in the bottom plate 40a of the orifice disk body 40. The other end of the outer part of the orifice passage P, located at a position coming substantially full circle from the one end thereof, opens into the inner part of the orifice passage P (the groove p1). The other end of the inner part of the orifice passage P opens into the balancing chamber f2 through a slot 41a formed in the lid member 41.

The size (cross-sectional area and length) of the orifice passage P formed by the connection of its inner and outer parts is tuned to relatively low-frequency and large-amplitude vibrations, such as vibrations at engine start-up, jerky vibrations at gear change or shaking during vehicle cruise. The engine mount A is configured to produce a liquid column resonance in response to such low-frequency and large-amplitude vibrations.

The accommodation room R formed inwardly of the orifice passage P as described previously houses a movable plate 42 made of rubber. When relatively high-frequency and small-amplitude vibrations, such as engine idling vibrations or engine vibrations resulting in muffled sounds, are input to the engine mount A to slightly change the liquid pressure in the pressure receiving chamber f1 at relatively short periods of time, the movable plate 42 responding to the changes moves (oscillates) within the accommodation room R to absorb the vibrations.

Figure 2:
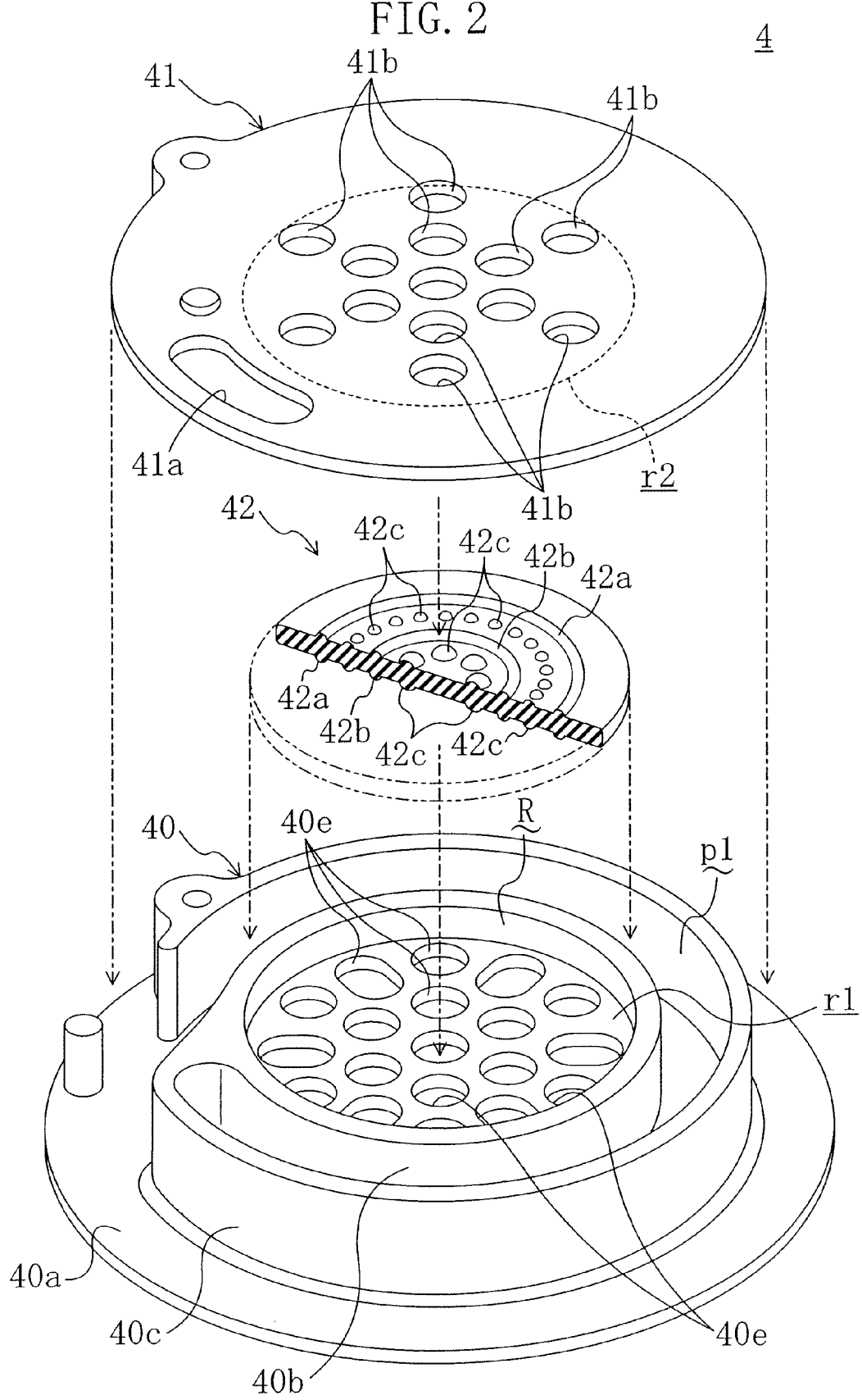
FIG. 2 is an exploded perspective view showing the structure of an orifice disk.

Specifically, as shown in FIGS. 1B and 2, a central part of the bottom plate 40a of the orifice disk body 40 is formed in the shape of a raised bottom higher than the peripheral part surrounding it and its top surface constitutes the bottom surface r1 (shown only in FIG. 2) of the accommodation room R. A top surface r2 of the accommodation room R facing the bottom surface r1 is constituted by the bottom surface of a central part of the lid member 41 and creates, together with the bottom surface r1, a slightly larger clearance than the thickness of the movable plate 42. The bottom surface r1 of the accommodation room R is a surface of a division wall separating the accommodation room R from the pressure receiving chamber f1, while the top surface r2 thereof is a surface of another division wall separating the accommodation room R from the balancing chamber f2. The former division wall has a plurality of communication holes 40e, 40e, . . . opening into the accommodation room R and the pressure receiving chamber f1, while the latter division wall has a plurality of communication holes 41b, 41b, . . . opening into the accommodation room R and the balancing chamber f2.

To be more specific, in this embodiment, the plurality of communication holes 40e, 40e, . . . at the bottom of the accommodation room R (in the bottom plate 40a of the orifice disk body 40) are arranged with one at the center of the bottom plate 40a corresponding to the center of the movable plate 42 and the others concentrically in two circumferential rows around the central hole. Each circumferential row of communication holes 40e, 40e, . . . are arranged at equal intervals. The inner circumferential row of communication holes 40e, 40e, . . . each have a circular shape. The outer circumferential row of communication holes 40e, 40e, . . . comprise circular communication holes and elliptic communication holes alternately arranged.

On the other hand, the plurality of communication holes 41b, 41b, . . . at the top of the accommodation room R (in the lid member 41) are arranged in a radial pattern with respect to the center of the lid member 41 corresponding to the center of the movable plate 42, i.e., to run out in six radial rows from the center of the lid member 41. The radial rows of communication holes 41b, 41b, . . . are spaced substantially at regular circumferential intervals. As for the example shown in FIGS. 2 and 3, the interval between each adjacent radial rows of communication holes 41b, 41b, . . . is approximately 60° in terms of central angle and all the communication holes 41b, 41b, . . . can be said to be arranged like a snow crystal to divide the accommodation room top surface r2 into six equal regions.

In another respect, the communication holes 41b, 41b, . . . in the top surface r2 of the accommodation room R can be said to be arranged concentrically in two circumferential rows around the central hole, like the communication holes 40e, 40e, . . . in the bottom surface r1. In the example shown in FIGS. 2 and 3, the inner circumferential row of communication holes 41b, 41b, . . . have the same arrangement as those in the bottom surface r1, while the outer circumferential row of communication holes 41b, 41b, . . . are the same as the outer circumferential row of communication holes 40e, 40e, . . . except the elliptic communication holes (i.e., only the circular communication holes are formed as the outer circumferential row of communication holes 41b, 41b, . . . ). Therefore, the total circumferential opening length of the outer circumferential row of communication holes 41b, 41b, . . . is shorter than the total circumferential length of non-opening sections on the same circumference.

Figure 4A:
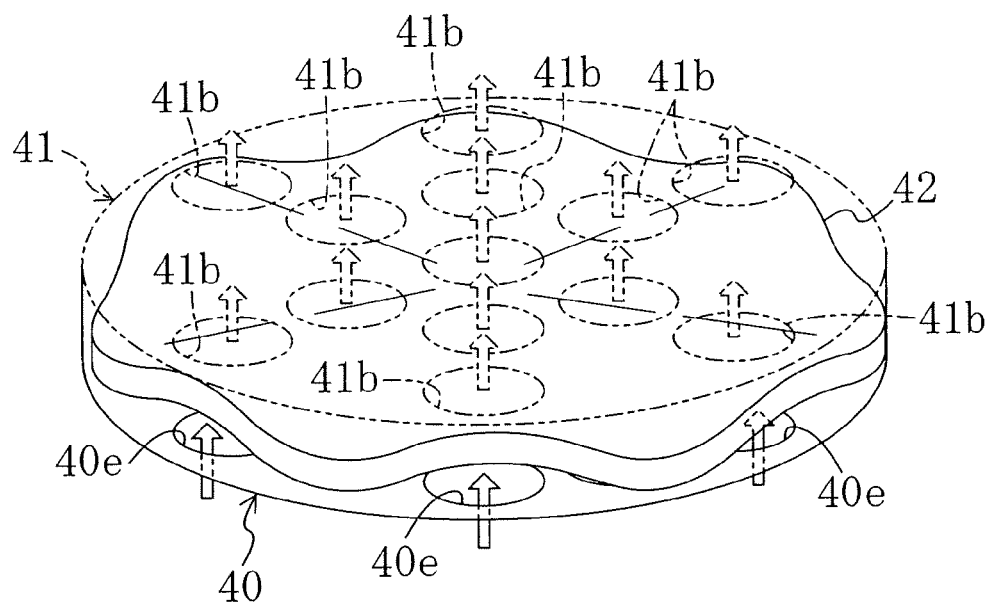
FIGS. 4A and 4B are conceptual diagrams showing how the movable plate undulates by the influence of a liquid pressure.

To sum up, out of all the communication holes 40e, 40e, . . . and 41b, 41b, . . . communicating the accommodation room R for the movable plate 42 with the pressure receiving chamber f1 and the balancing chamber f2, the communication holes 40e, 40e, . . . opening into the pressure receiving chamber f1 are arranged approximately evenly over the entire bottom surface r1 of the accommodation room R, while the communication holes 41b, 41b, . . . opening into the balancing chamber f2 are arranged in radial rows spaced at circumferential intervals of approximately 60 degrees to divide the whole circumference of the top surface r2 into six equal segments. Thus, the movable plate 42 undergoing a liquid pressure acting through the communication holes 40e, 40e, . . . or 41b, 41b, . . . from the pressure receiving chamber f1 or the balancing chamber f2 deforms to circumferentially undulate as schematically shown in FIGS. 4A and 4B.

Figure 4B:
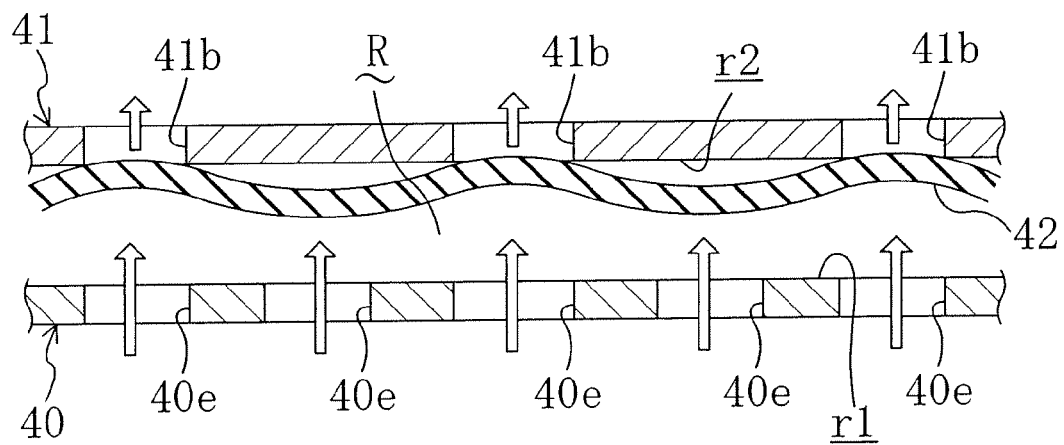

More specifically, for example, when the liquid pressure in the pressure receiving chamber f1 increases owing to the input of vibrations to the engine mount A, the liquid flows into the accommodation room R through the communication holes 40e, 40e, . . . located towards the pressure receiving chamber f1 (lower communication holes in the figure), as shown in the long arrows in FIG. 4B microscopically showing the behavior of the movable plate 42. Thus, the movable plate 42 is entirely moved towards the balancing chamber f2 (upward in the figure) to urge the liquid towards extrusion from the accommodation room R.

During the time, at sites close to the radially arranged communication holes 41b, 41b, . . . opening into the balancing chamber f2, the liquid is smoothly extruded through the communication holes 41b, 41b, . . . as shown in the short arrows in FIG. 4, whereby the movable plate 42 largely deforms towards the balancing chamber f2. On the other hand, at the other sites, the liquid between the movable plate 42 and the top surface r2 restrains the deformation of the movable plate 42. As a result, the movable plate 42 deforms to undulate at spatial periods corresponding to the circumferential intervals of the communication holes 41b, 41b, . . . as shown in FIG. 4.

When the movable plate 42 having deformed to circumferentially undulate entirely moves towards the balancing chamber f2, its parts relatively largely deformed as described above first come into contact with the top surface r2 and then squash and deform to gradually extend the contact region of the movable plate 42 with the top surface r2. Therefore, the area of the movable plate 42 to come into contact with the top surface r2 at a time becomes very small, which effectively disperses a shock to the top surface r2. In addition, the liquid between the top surface of the movable plate 42 and the top surface r2 of the accommodation room R as described above acts as a cushion, which also eases the shock.

Figure 3:
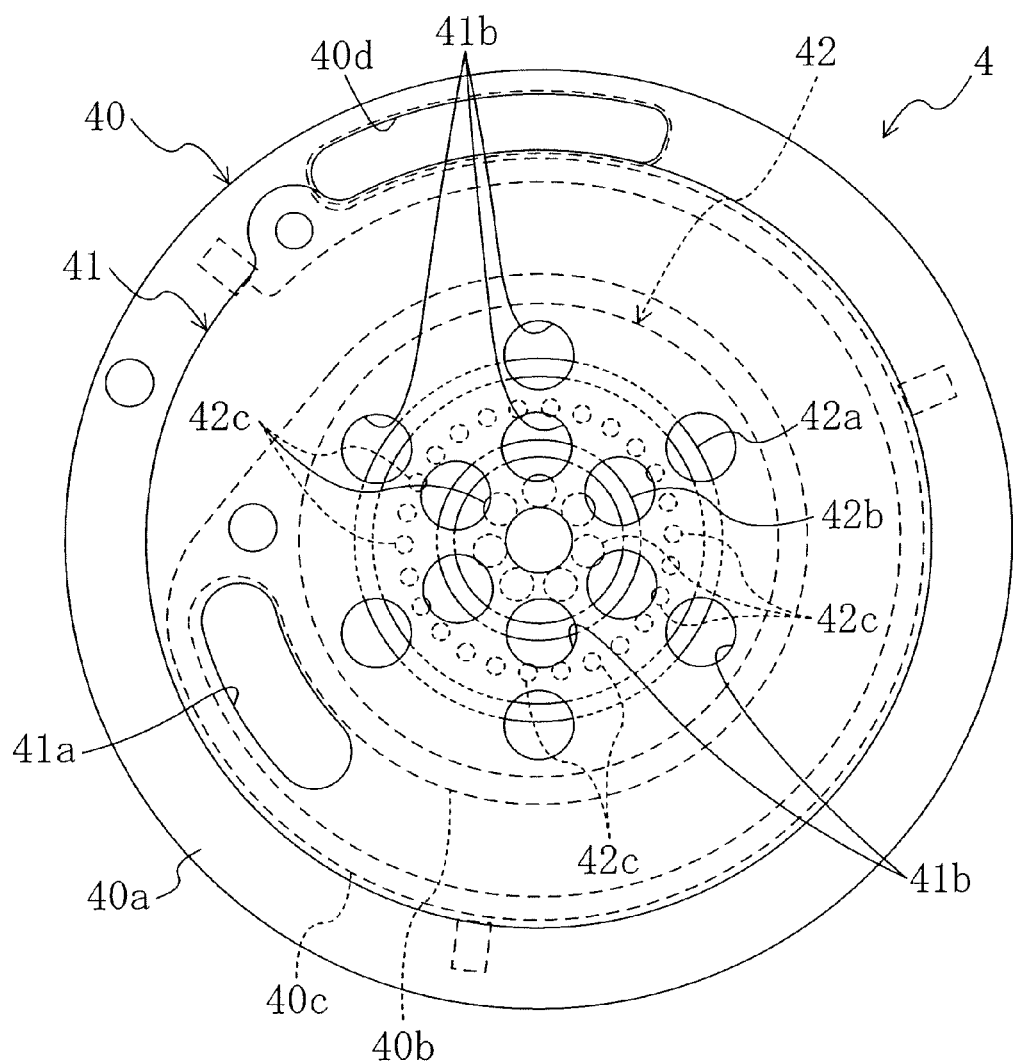
FIG. 3 is a see-through view of the orifice disk along the axis Z of the mount, illustrating the relative positions of ridges and projections on a movable plate and communication holes in the top wall of an accommodation room facing the ridges and projections.

Furthermore, as seen from FIGS. 2 and 3, the open area ratio of the communication holes 41b, 41b, . . . to the whole of the top surface r2 (the ratio of the open area to the non-open area) is relatively large at portion of the top surface r2 towards the center thereof. Thus, the portion of the top surface r2 towards the center is more influenced by changes in liquid pressure than the portion of the top surface r2 towards the peripheral edge thereof and, therefore, the portion of the movable plate 42 towards the center thereof will earlier come close to the top surface r2 than the other portion thereof. However, the portion of the movable plate 42 towards the center has ridges 42a and 42b and projections 42c, 42c, . . . formed thereon as described below, whereby these raised portions first come into contact with the top surface r2 to ease a shock due to contact.

Specifically, as shown in FIG. 2, each of the top and bottom surfaces of the movable plate 42 has first and second ridges 42a and 42b of semi-circular cross section formed concentrically thereon and semi-spherical projections 42c, 42c, . . . formed concentrically in two circumferential rows. Each circumferential row of projections 42c, 42c, . . . are arranged at circumferentially equal intervals. Since the ridges 42a and 42b and projections 42c, 42c, . . . formed on the top surface of the movable plate 42 have the same configuration as those formed on the bottom surface thereof, a description is given below only of the top surface of the movable plate 42.

As shown in FIG. 3, when the orifice disk 4 is seen through from above along the mount axis Z (not shown), the first and second ridges 42a and 42b are disposed to pass under and across the outer and inner circumferential rows of communication holes 41b, 41b, . . . , respectively. Therefore, when the movable plate 42 moves up, each of the first and second ridges 42a and 42b comes into contact with the top surface r2 only between circumferentially adjacent communication holes 41b and 41b.

As seen from FIG. 3, since each pair of adjacent communication holes 41b and 41b in the outer circumferential row are spaced a relatively large distance away from each other, the contact area of the ridge 42a with the top surface r2 between the pair of adjacent communication holes may be expected to be relatively large. According to this embodiment, however, since the movable plate 42 circumferentially largely undulates at its portion corresponding to the outer circumferential row of communication holes 41b, 41b, . . . , the area of the portion of the movable plate 42 to come into contact with the top surface r2 at a time is small and, therefore, the shock due to the contact is also small. On the other hand, the inner circumferential row of communication holes 41b, 41b, . . . are considerably circumferentially close to one another and the distance between each pair of circumferentially adjacent communication holes 41b and 41b is narrow. Therefore, the contact area of the ridge 42b with the top surface r2 between the pair of circumferentially adjacent communication holes 41b and 41b is small and the shock due to the contact is also small.

Furthermore, the inner and outer circumferential rows of semi-spherical projections 42c, 42c, . . . correspond to two different regions of the accommodation room top surface r2 where the communication holes 41b, 41b, ... are not formed. In other words, the top surface r2 includes two annular regions where no communication hole 41b exist, one between the central communication hole 41b and the inner circumferential row of communication holes 41b, 41b, ... and the other between the inner circumferential row of communication holes 41b, 41b, ... and the outer circumferential row of communication holes 41b, 41b, ..., and the movable plate 42 has the inner and outer circumferential rows of projections 42c, 42c, ... formed to correspond to the two annular regions.

Since the projections 42c, 42c, ... disposed at circumferential intervals each have a semi-spherical shape, their contact area with the accommodation room top surface r2 upon upward movement of the movable plate 42 is relatively small and, therefore, the shock due to the contact is small. In addition, since all the projections 42c, 42c, ... face the regions of the top surface r2 where the communication holes 41b, 41b, ... do not exist, their contact area hardly changes even when the movable plate 42 moves around the axis Z.

This is true also for the first and second ridges 42a and 42b and, therefore, the contact area of them with the top surface r2 of the accommodation room R hardly changes with the movement of the movable plate 42 around the axis Z. This means that even if the movable plate 42 was in a circumferentially different position relative to the orifice disk 4 owing to variations in its assembly into the orifice disk 4, the magnitude of shock upon its contact with the bottom surface r1 or the top surface r2 of the accommodation room R would not change. Therefore, this feature is advantageous, for example, in restraining abnormal noise in the passenger compartment to a certain level or below it by measures intended for the vehicle body.

In the example shown in FIGS. 2 and 3, the inner circumferential row of projections 42c, 42c, ... each have a relatively large diameter, project higher and come closer at their tops to the top surface r2 than the outer circumferential row of projections 42c, 42c, ... and the first and second ridges 42a and 42b.

—Behavior and Effects—

According to the engine mount A of embodiment 1 including the orifice disk 4 having the above structure, when relatively low-frequency and large-amplitude vibrations, such as jerky vibrations at gear change, are input to the engine mount A to relatively largely change the relative position of the connecting fitting 1 and the housing 2, the volume of the pressure receiving chamber f1 relatively largely changes with deformation of the rubber elastic material 3, which provides changes in the liquid pressure. With changes in the liquid pressure, the liquid flows back and forth through the orifice passage P between the pressure receiving chamber f1 and the balancing chamber f2. Thus, the vibrations to be input to the engine mount A can be well absorbed and damped.

During the time, the changes in the liquid pressure in the pressure receiving chamber f1 acts also on the accommodation room R through the communication holes 40e, 40e, ... formed in the bottom plate 40a of the orifice disk body 40 (at the bottom of the accommodation room R). However, since in the accommodation room R the movable plate 42 responding to the changes in the liquid pressure is pushed against the lid member 41 of the orifice disk 4 to close the communication holes 41b, 41b, ... in the lid member 41, the liquid does not flow through these communication holes 41b, 41b, ... from the accommodation room R into the balancing chamber f2, i.e., does not flow from the pressure receiving chamber f1 into the balancing chamber f2. Therefore, the liquid flow through the orifice passage P can be secured.

On the other hand, when relatively small-amplitude vibrations due to variations in engine rotation, such as idling vibrations, are input to the engine mount A to slightly change the liquid pressure in the pressure receiving chamber f1 at short periods of time, such small changes in liquid pressure are transmitted through the communication holes 40e, 40e, ... to the accommodation room R and are absorbed by the movement of the movable plate 42 in the accommodation room R.

For example, when the vehicle goes over a large bump in a road so that a strong force is input to the engine mount A to rapidly raise the liquid pressure in the pressure receiving chamber f1, it may be expected that according to conventional techniques the movable plate 42 responding to the rise in the liquid pressure will abut against the top surface r2 that is a surface of the division wall adjoining the balancing chamber f2 and a shock due to the contact will be transmitted to the vehicle body to produce abnormal noise in the passenger compartment. However, according to this embodiment, since the number of communication holes 41b, 41b, ... in the top surface r2 is smaller than the number of communication holes 40e, 40e, ... in the bottom surface r1 and the total open area of the communication holes 41b, 41b, ... is smaller than that of the communication holes 40e, 40e, ..., the resistance to the upward movement of the movable plate 42 is high, which can ease a shock due to contact of the movable plate 42 with the top surface r2.

In addition, the contact of the movable plate 42 with the top surface r2 is gradually implemented with its portion towards the center first and the rest delayed: the inner circumferential row of projections 42c, 42c, ... of relatively large size first come into contact with the top surface r2 and then squash; the outer circumferential row of projections 42c, 42c, ... and the first and second ridges 42a and 42b then come into contact with it; and the entire top surface of the movable plate 42 then comes into contact with it. Therefore, the impact force on the top of the accommodation room R, i.e., the lid member 41 of the orifice disk 4, can be dispersed in a time-shared manner and thereby eased.

Furthermore, since the ridges 42a and 42b and the semi-spherical projections 42c, 42c, ... of the movable plate 42, all of which will early come into contact with the top surface r2, have a small total contact area, a shock due to their contact is not significant.

Furthermore, the entire movable plate 42 (particularly its portion towards the peripheral edge) which will come into contact with the top surface r2 of the accommodation room R deforms to undulate by the action of the liquid pressure through the communication holes 40e, 40e, ... and 41b, 41b, ... (see FIG. 4) and the movable plate 42 gradually comes into contact with the top surface r2, starting with its relatively largely deformed parts. This also provides effective shock dispersion and enables the liquid between the top surface r2 and the parts of the movable plate 42 to come late into contact with the top surface r2 to act as a cushion to ease the shock well.

To sum up, in the engine mount A according to Embodiment 1, the rubber movable plate 42 is contained in the accommodation room R in the orifice disk 4, the communication holes 40e, 40e, ... communicating the accommodation room R with the pressure receiving chamber f1 are approximately evenly arranged, the communication holes 41b, 41b, ... communicating the accommodation room R with the balancing chamber f2 are arranged in radial rows spaced at circumferential intervals of 60 degrees, and the movable plate 42 is configured to deform to circumferentially undulate by the action of the liquid pressure through the communication holes 40e, 40e, ... and 41b, 41b, .... Therefore, particularly, a shock due to contact of the portion of the movable plate 42 towards the peripheral edge with the top surface r2 can be effectively dispersed and thereby eased. Hence, the vibration transmissibility to the vehicle body can be reduced as compared with the conventional techniques, thereby reducing abnormal noise in the passenger compartment.

Furthermore, since the total open area of the communication holes 41b, 41b, towards the balancing chamber f2 becomes smaller than that of the communication holes 40e, 40e, . . . towards the pressure receiving chamber f1 owing to the above arrangement of the communication holes 40e, 40e, . . . and 41b, 41b, . . . , the resistance to the movement of the movable plate 42 towards the balancing chamber f2 can be increased to ease the shock upon contact with the top surface r2.

Figure 5:
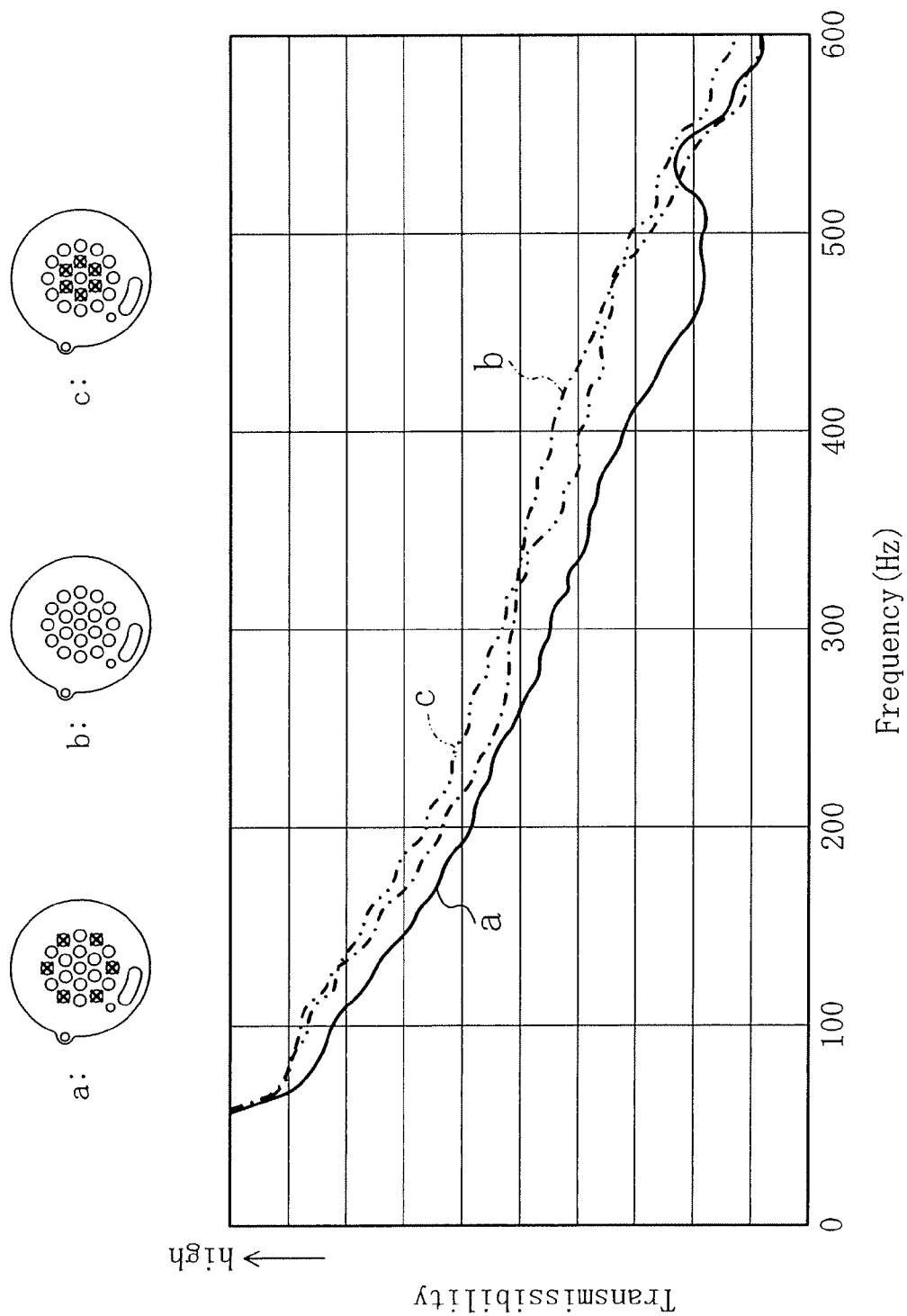
FIG. 5 is a graph showing the frequency characteristics of vibration transmissibility from the engine mount to the vehicle body.

FIG. 5 is a graph showing results of an examination in which sinusoidal vibrations at predetermined periods were input to the engine mount A of Embodiment 1, the vibration transmissibility to the vehicle body was measured and its frequency characteristics were determined. The curve a shown in the solid line in the figure indicates characteristics of an inventive example of this embodiment in which the communication holes 41b, 41b, . . . are arranged in a radial pattern in the accommodation room top surface r2 (the lid member 41) as also shown in a schematic illustration in the upper part of the figure (where the marks x indicate that the communication holes are closed).

The curve b shown in the dash-single-dot line and the curve c shown in the dash-double-dot line indicate respective characteristics of two different comparative examples, i.e., a comparative example in which the communication holes 41b, 41b, . . . are approximately evenly formed over the entire top surface r2 and a comparative example in which the inner circumferential row of communication holes 41b, 41b, . . . are closed. The comparative example shown in the curve c has the same number of closed communication holes as the inventive example shown in the curve a. The graph shows that the inventive example (curve a) exhibited lower vibration transmissibility to the vehicle body over a wide frequency range from 100 to 500 Hz than the comparative examples (curves b and c) and, therefore, reduced shocks due to contact of the movable plate 42.

Figure 6:
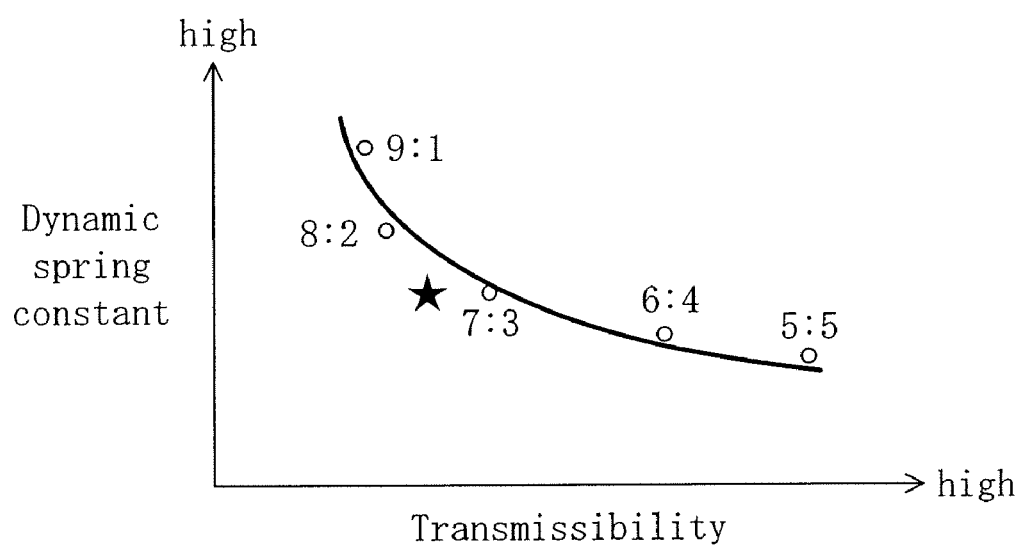
FIG. 6 is a graph showing results of an examination of how the dynamic spring constant and the vibration transmissibility of the engine mount change with changes in the open area ratio between the communication holes adjoining the pressure receiving chamber and the communication holes adjoining the balancing chamber.

FIG. 6 shows results of another examination of how the dynamic spring constant and the vibration transmissibility of the engine mount A change with changes in the open area ratio between the communication holes 40e, 40e, . . . adjoining the pressure receiving chamber f1 and the communication holes 41b, 41b, . . . adjoining the balancing chamber f2. The hollow circles in the figure indicate the cases where the area of communication holes 41b, 41b, . . . approximately evenly opened over the entire top surface r2 as in Comparative Example b shown in FIG. 5 was changed. When the ratio of open area (hereinafter, referred to as "the open area ratio") was a common value, 5:5, the dynamic spring constant was low but the vibration transmissibility was considerably high.

Next, when the size of each communication hole 41b in the top surface r2 was stepwise reduced to increase the open area ratio of communication holes towards the pressure receiving chamber f1 to those towards the balancing chamber f2 (6:4 . . . 9:1), the vibration transmissibility was gradually lowered but the passage of liquid out of the orifice disk 4 into the balancing chamber f2 became worse to gradually increase the dynamic spring constant. In these cases, if the open area ratio is within the range from about 5:5 to about 7:3, the dynamic spring constant is not so high, which is advantageous in lowering the vibration transmissibility. However, if the open area ratio exceeds 7:3, the dynamic spring constant rapidly increases.

In contrast, in the engine mount A of this embodiment, as described previously, the communication holes 41b, 41b, . . . in the accommodation room top surface r2 are arranged in a radial pattern to make the open area of the top surface r2 smaller than that of the bottom surface r1 towards the pressure receiving chamber f2 and set the open area ratio of communication holes towards the pressure receiving chamber f1 to communication holes towards the balancing chamber f2 at approximately 7:3. The filled asterisk in the figure indicates the inventive example. According to the inventive example, as described previously, the radial arrangement of communication holes 41b, 41b, . . . eased shocks and lowered the vibration transmissibility to the vehicle body.

Embodiment 2

Figure 7:
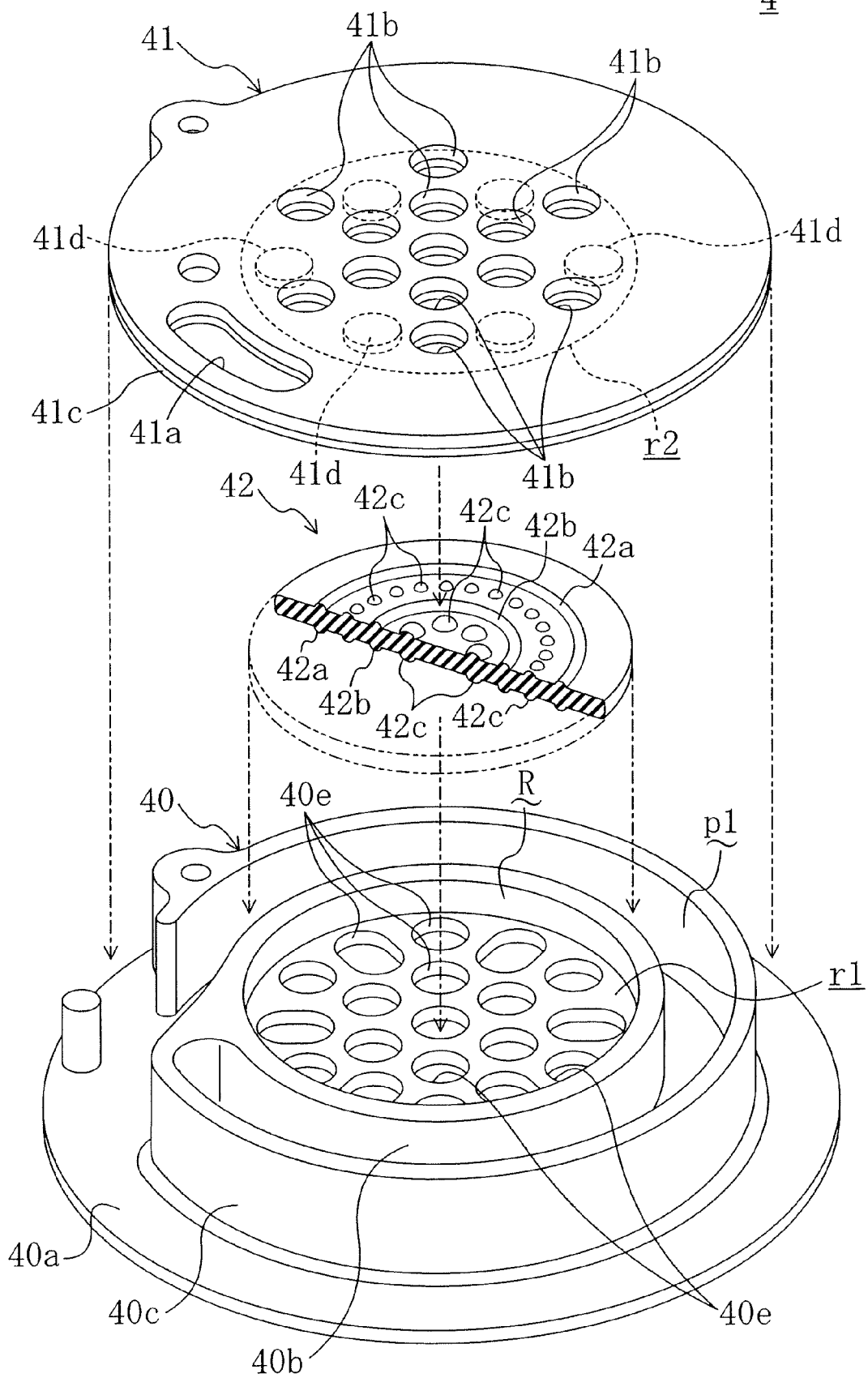
FIG. 7 is a corresponding view of FIG. 2, showing an orifice disk according to Embodiment 2 of the invention.
Figure 8:
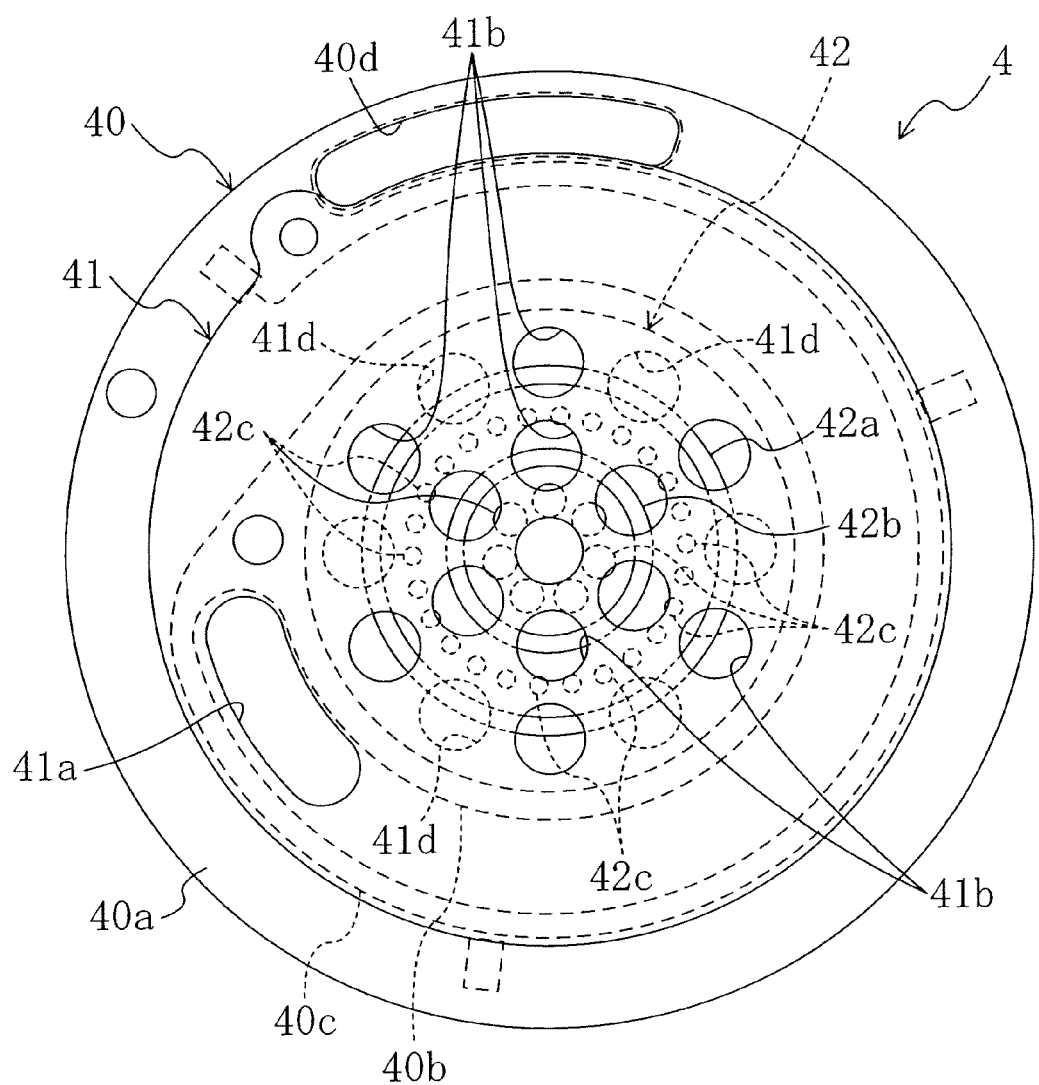
FIG. 8 is a corresponding view of FIG. 3, showing the orifice disk according to Embodiment 2.
Figure 9:
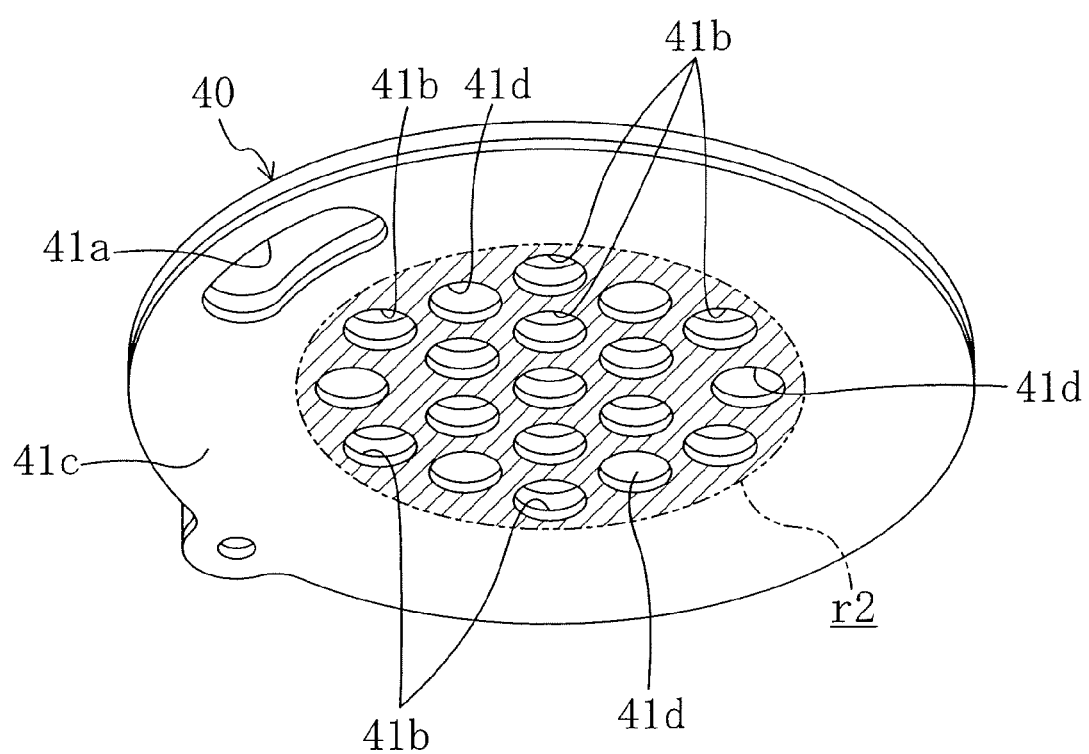
FIG. 9 is a perspective view showing a lid member of the orifice disk in which dents open at the bottom surface.

FIGS. 7 to 9 show the structure of an orifice disk 4 according to Embodiment 2 of the invention. Embodiment 2 is different from Embodiment 1 only in the structure of part of the lid member 41 of the orifice disk 4 and the rest of the structure is the same as in Embodiment 1. Therefore, like elements are indicated by the same reference numerals and a description of them is not given here.

Specifically, the lid member 41 in Embodiment 2 has communication holes 41b, 41b, . . . formed therein as in Embodiment 1 and, as shown in a bottom view of FIG. 9, has a rubber layer 41c formed, such as by vulcanization adhesion, on the entire bottom surface thereof (the shaded area of FIG. 9 shows a part of the lid member 41 corresponding to the top surface r2 of the accommodation room R). The rubber layer 41c is formed with dents 41d, 41d, . . . of circular cross section, one at the midpoint between each pair of circumferentially adjacent communication holes 41b and 41b in the outer circumferential row. In other words, the dents 41d, 41d, . . . and the communication holes 41b, 41b, . . . are alternately arranged at circumferentially equal intervals.

Figure 10A:
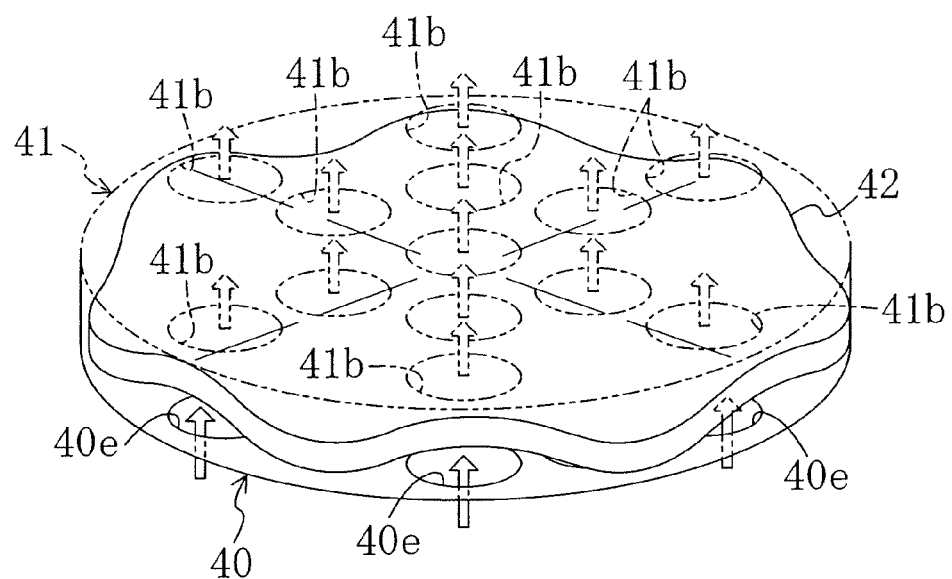
FIGS. 10A and 10B are corresponding views of FIGS. 4A and 4B, showing a movable plate in the orifice disk.
Figure 10B:
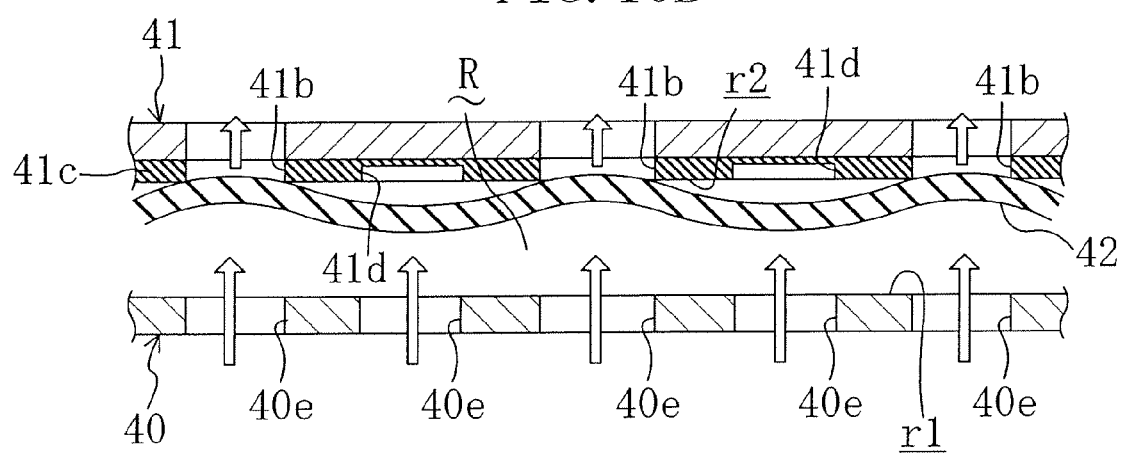

Thus, also in Embodiment 2, as schematically shown in FIGS. 10A and 10B, when the movable plate 42 undergoes a liquid pressure acting through the communication holes 40e, 40e, . . . or the communication holes 41b, 41b, . . . from the pressure receiving chamber f1 or the balancing chamber f2, it deforms to entirely circumferentially undulate, which eases a shock upon contact of the movable plate 42 with the bottom surface r1 or the top surface r2 of the accommodation room R.

Furthermore, according to Embodiment 2, since the top surface r2 of the accommodation room R is formed of the rubber layer 41c, the shock due to contact of the movable plate 42 can be further eased. In addition, since the dents 41d, 41d, . . . are formed at the midpoints between the circumferentially adjacent communication holes 41b and 41b in the outer circumferential row, the shock can be still further eased.

Figure 11A:
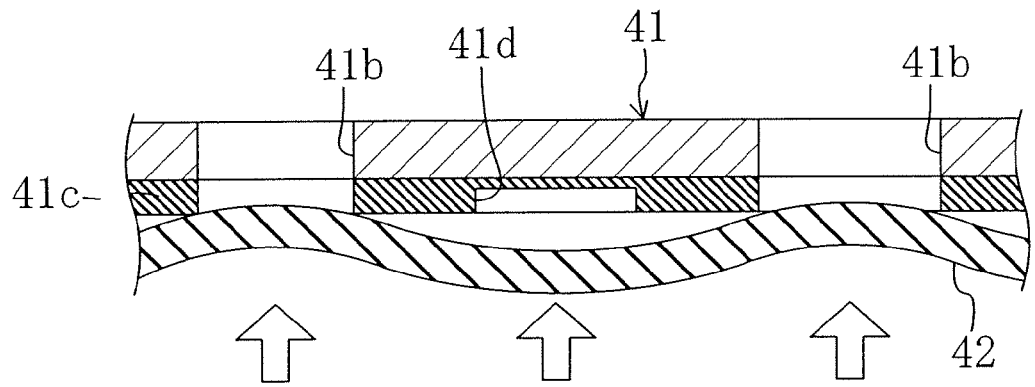
FIGS. 11A to 11C are conceptual diagrams illustrating microscopic deformations of the movable plate.

To be more specific, when a portion of the circumferentially undulating movable plate 42 towards the peripheral edge comes into contact, for example, with the top surface r2 of the accommodation room R, as shown in FIG. 11A, its relatively largely deformed parts first come into contact with the top surface r2 and then squash to gradually extend the contact region of the movable plate 42 to the surrounding regions. In this case, the liquid sandwiched between the top surface of the movable plate 42 and the top surface r2 of the accommodation room R acts like a cushion.

Figure 11B:
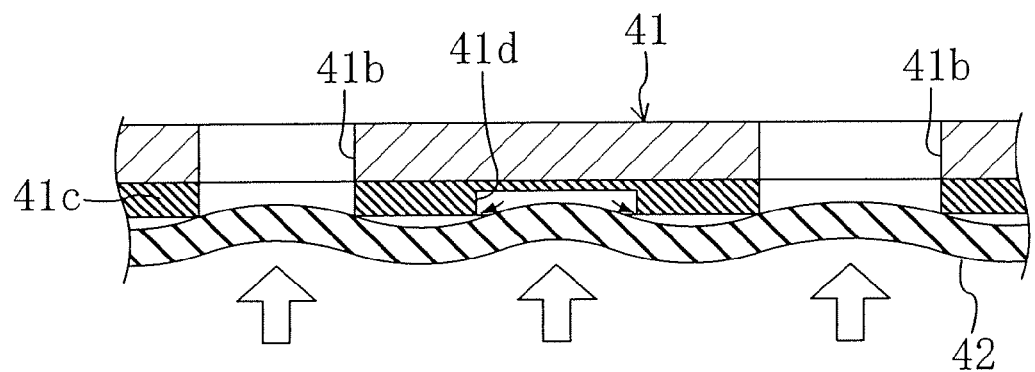
Figure 11C:
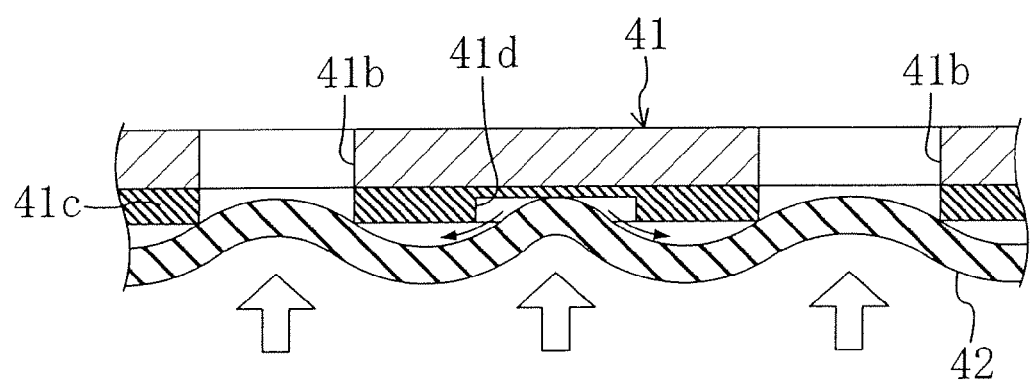

Furthermore, when the dents 41d, 41d, . . . are formed in the top surface r2 to correspond to the parts of the movable plate 42 which will sandwich the liquid between its top surface and the top surface r2 of the accommodation room R, i.e., the parts thereof which will come late into contact with the top surface r2, as shown in FIG. 11B, the parts of the movable plate 42 which will come late into contact with the top surface r2 extrude the liquid out of the dents 41d (shown in the thin solid arrows in the figure). The extruded liquid pushes in between the parts of the top surface r2 surrounding the dents 41d and the movable plate 42 and separates the top surface r2 and the movable plate 42 from each other (see FIG. 11C). The production of such a complicated liquid flow can be believed to provide consumption of kinetic energy of the movable plate 42 and thereby ease a shock due to the contact.

To sum up, according to the engine mount A of Embodiment 2, the rubber movable plate 42 contained in the orifice disk 4 is configured to deform to circumferentially undulate by the action of the liquid pressure through the communication holes 40e, 40e, ... and 41b, 41b, ..., like Embodiment 1. Therefore, particularly, a shock due to contact of the portion of the movable plate 42 towards the peripheral edge with the top surface r2 can be effectively dispersed and thereby eased.

Furthermore, out of the undulating portion of the movable plate 42 towards the peripheral edge, parts that will come late into contact with the top surface r2 are provided with dents 41d, one at the midpoint between each pair of circumferentially adjacent communication holes 41b and 41b. Therefore, the liquid in the dents 41d provides high cushion effect, thereby further effectively easing the shock due to the contact. Thus, the peak of vibration transmissibility to the vehicle body can be significantly lowered to well reduce abnormal noise in the passenger compartment.

Figure 12:
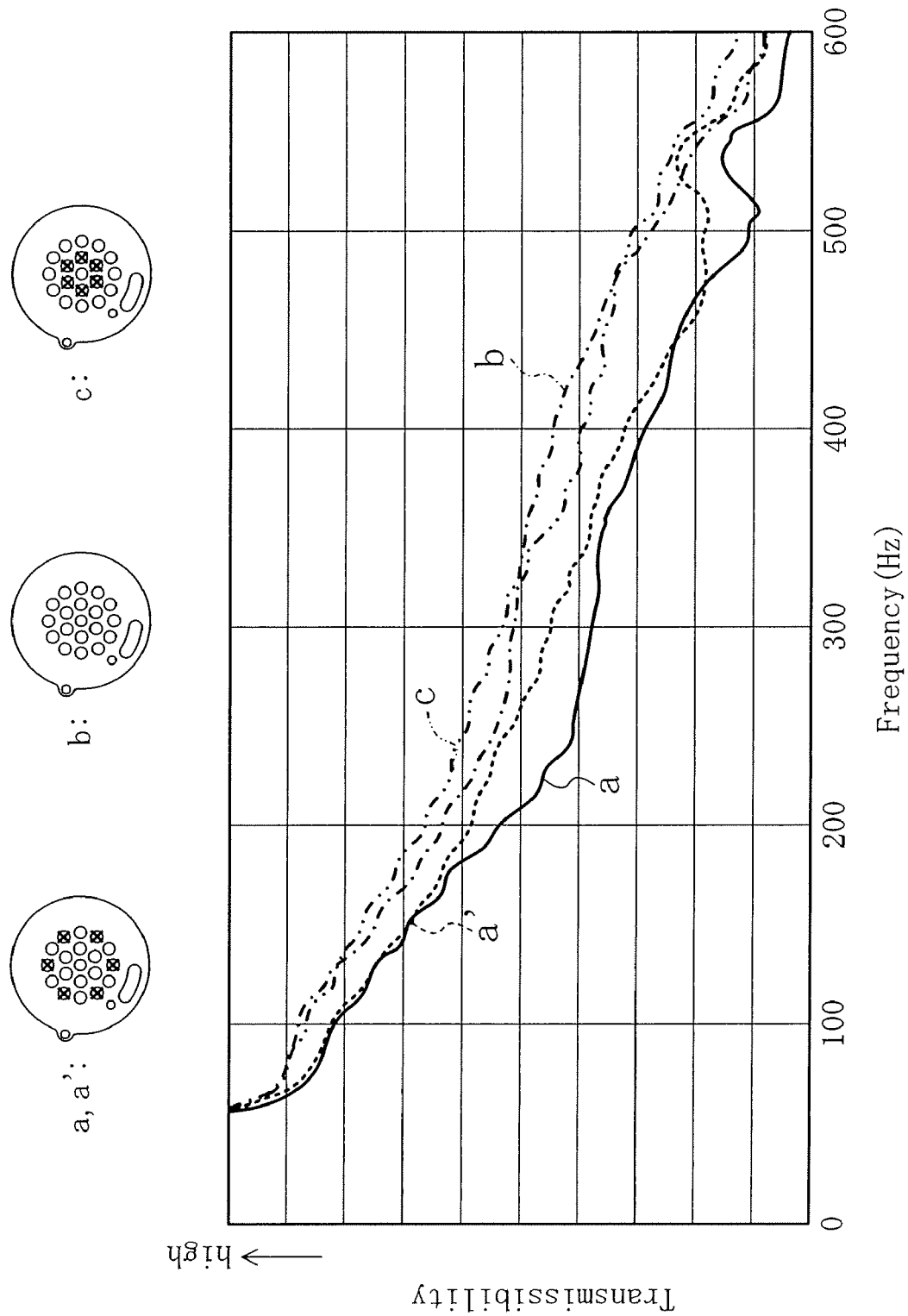
FIG. 12 is a corresponding graph of FIG. 5 for the engine mount according to Embodiment 2.

FIG. 12 is a graph showing results of an examination of the engine mount A of Embodiment 2 in terms of the frequency characteristics of the vibration transmissibility to the vehicle body, wherein the examination results of the engine mount A of Embodiment 2 are indicated by the solid curve a. In this figure, the broken curve a' indicates the examination results of the engine mount of Embodiment 1 (the solid curve a in FIG. 5), the dash-single-dot curve b and the dash-double-dot curve c indicate the curves b and c, respectively, in FIG. 5.

FIG. 5 shows that the curves a and a' exhibited, as compared with the curves b and c, lower vibration transmissibilities to the vehicle body over a wide frequency range from 100 to 500 Hz and that undulation of the movable plate 42 eased shocks upon contact with the top surface r2. Furthermore, FIG. 5 shows that the curve a exhibited, as compared with the curve a', a lower vibration transmissibility over the frequency range from 200 to 300 Hz and that, particularly, impact forces corresponding to this frequency range were eased by the provision of dents 41d.

Other Embodiments

The anti-vibration mounting device of the invention is not limited to the structures of the above embodiments and includes other various structures. For example, although in Embodiments 1 and 2 the circumferential intervals of the communication holes 41b, 41b, ... arranged in a radial pattern at the top of the accommodation room R (in the lid member 41 of the orifice disk 4) are 60 degrees in terms of central angle, they are not limited to this central angle. The greater the circumferential intervals, the more advantageous it becomes to largely undulate the movable plate 42 but the more difficult it becomes to secure the open area. In view of the balance between the deformability and the open area, the suitable circumferential intervals range from 36 to 90 degrees. Particularly preferable circumferential intervals are believed to be 45 degrees (eight equal segments), approximately 51.4 degrees (seven equal segments) and 60 degrees (six equal segments).

Furthermore, although in the above embodiments the communication holes 41b, 41b, ... are arranged in a radial pattern and concentrically in two circumferential rows, i.e., inner and outer circumferential rows, the communication holes 41b, 41b, ... are not limited to the above arrangement and may be arranged in three or more circumferential rows or may not be arranged on concentric circumferences, i.e., may be circumferentially staggered. Alternatively, the communication holes 41b, 41b, ... may not be arranged in a radial pattern. In this case, it is necessary that at least the outermost circumferential row of communication holes 41b, 41b, ... should be arranged at relatively large circumferential intervals to have a total circumferential opening length shorter than the total circumferential length of non-opening sections on the same circumference.

Figure 13:
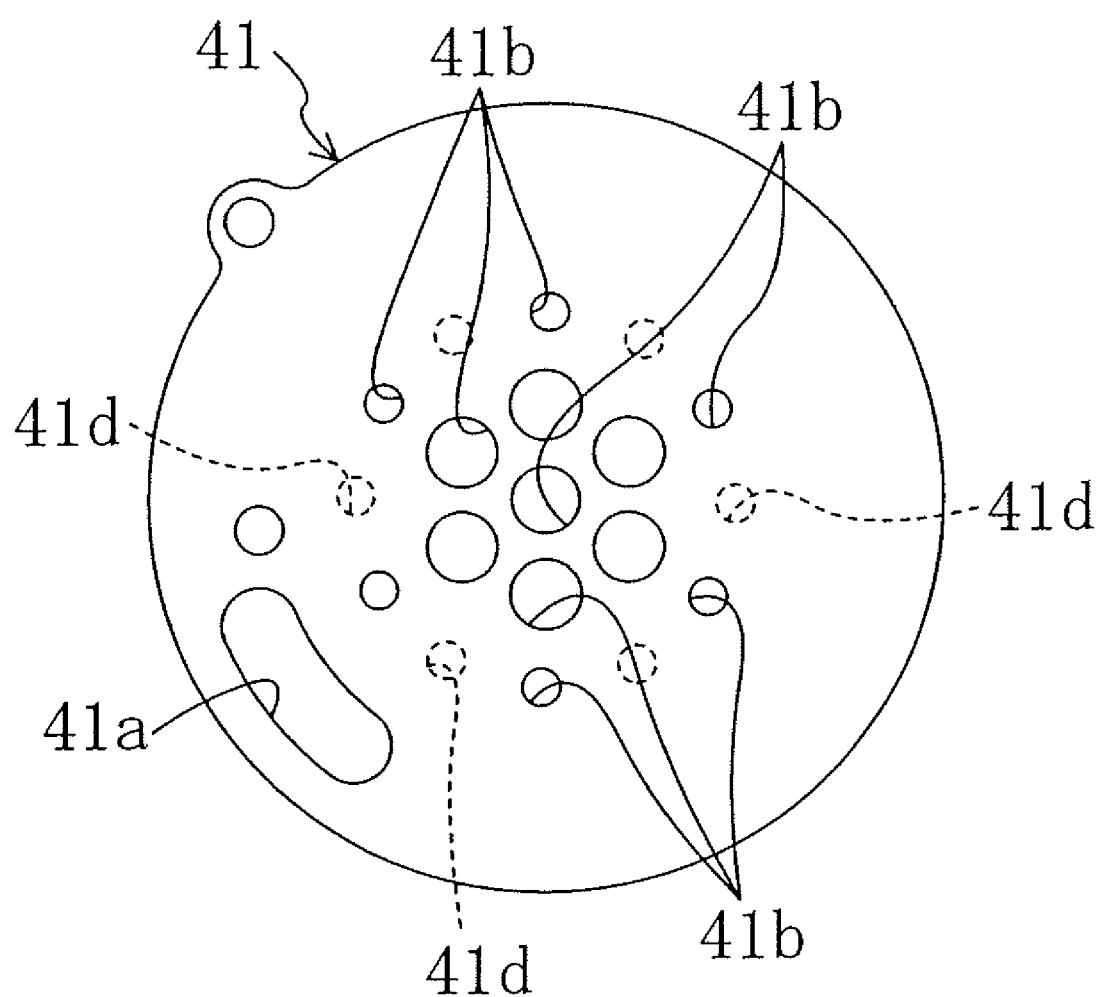
FIG. 13 is an illustration of an orifice disk according to another embodiment of the invention in which the outer circumferential row of communication holes have a smaller size than the other communication holes.

Furthermore, although in the above embodiments the communication holes 41b, 41b, ... each have a circular shape and approximately the same open area, they are not limited to this configuration and may be slots or may have different open areas. In this case, as shown as another example of Embodiment 2 in FIG. 13, the open area of the communication holes 41b, 41b, ... towards the peripheral edge of the lid member 41 is made smaller than that of the communication holes 41b, 41b, ... towards the center thereof. Thus, the liquid pressure can have more effect on the portion of the movable plate 42 towards the center thereof, which is preferable for vibration isolation.

Furthermore, although in the above embodiments the communication holes 41b, 41b, ... towards the balancing chamber f2 are arranged in a radial pattern but the communication holes 40e, 40e, ... towards the pressure receiving chamber f1 are approximately evenly opened, all the communication holes 40e, 40e, ... and 41b, 41b, ... may be arranged in a radial pattern. In this case, each communication hole 41b towards the balancing chamber f2 preferably has a relatively small size (open area). As the case may be, only the communication holes 40e, 40e, ... towards the pressure receiving chamber f1 can be arranged in a radial pattern.

Furthermore, although in Embodiment 2 the rubber layer 41c is formed on the bottom surface of the lid member 41 of the orifice disk 4, the invention is not limited to this. For example, instead of the formation of the rubber layer 41, the dents 41d, 41d, may be formed in the lid member 41 such as by press working.

Furthermore, although in the above embodiments the ridges 42a and 42b and projections 42c, 42c, ... are formed on both the surfaces of the movable plate 42 and the inner circumferential row of projections 42c, 42c, ... are higher than the other projections and ridges, the invention is not limited to this configuration. For example, the ridges 42a and 42b and projections 42c, 42c, ... may have the same height or may be formed only on the surface of the movable plate 42 towards the balancing chamber f2. Alternatively, neither the ridges 42a and 42b nor the projections 42c, 42c, ... may be formed on both the surfaces of the movable plate 42.

Furthermore, the anti-vibration mounting device of the invention is not limited to the longitudinal engine mount A receiving compression load from above, like the above embodiments. For example, the invention can be applied to transverse engine mounts receiving downward tension load. Furthermore, the invention can be applied to various anti-vibration mounting devices other than engine mounts, such as suspension bushes.

What is claimed is:

1. A liquid-filled anti-vibration mounting device including a mounting member to be mounted to an object to be supported by the mounting member, a support member supporting the mounting member through a robber elastic material, a liquid chamber formed between the mounting member and the support member that changes to volume with deformation of the robber elastic material, a partition member partitioning the liquid chamber into a pressure receiving chamber and a balancing chamber and an orifice passage communicating the pressure receiving chamber and the balancing chamber with each other, the partition member containing a robber movable plate which is approximately circular in an accommodation room formed inside the partition member and having a plurality of communication holes formed therein to communicate the accommodation room with the pressure receiving chamber and the balancing chamber, the movable plate being movable to absorb changes in the liquid pressures of the pressure receiving chamber and the balancing chamber, wherein
at least a portion of the movable plate at an outer circumference thereof is formed into a flat plate,
the partition member includes a pair of division walls that defines the accommodation room therebetween, one division wall adjoining the pressure receiving chamber and the other adjoining the balancing chamber,
the plurality of communication holes are formed in the pair of division walls and arranged concentrically in two or more circumferential rows with respect to the center of the movable plate, and
each of the communication holes in an outermost circumferential row in a first one of the pair of division walls are aligned in a circumferential direction with a corresponding one of the communication holes in an outermost circumferential row in a second one of the pair of division walls, and each of a first set of the communication holes in the outermost circumferential row in the second one of the pair of division walls are aligned in a circumferential direction with one of the communication holes in the outermost circumferential row of the first one of the pair of division walls and each of a second set of the communication holes in the outermost circumferential row in the second one of the pair of division walls are aligned in a circumferential direction with a respective portion of the first one of the pair of division walls that separates adjacent holes in the outermost circumferential row of the first one of the pair of division walls, so that upon action of a liquid pressure through the communication holes on the movable plate, at least a portion of the movable plate towards the peripheral edge thereof is deformed to undulate in a circumferential direction by the action of the liquid pressure.

2. The anti-vibration mounting device of claim 1, wherein at least the outermost circumferential row of communication holes in the first one of the pair of division walls are arranged at specified circumferential intervals of not less than 36 degrees but not more than 90 degrees or greater to have a total circumferential opening length shorter than the total circumferential length of non-opening sections on the same circumference.

3. The anti-vibration mounting device of claim 2, wherein said at least the outermost circumferential row of communication holes in the first one of the pair of division walls each have a smaller open area than one or more inner circumferential rows of communication holes.

4. The anti-vibration mounting device of claim 1, wherein the movable plate is approximately circular, and the communication holes in at least one of the pair of division walls are arranged in a radial pattern with respect to the center of the movable plate and at specified circumferential intervals of not less than 36 degrees but not more than 90 degrees.

5. The anti-vibration mounting device of claim 4, wherein the communication holes of the outermost circumferential row of the first one of the pair of division walls have a smaller open area than communication holes of one or more inner circumferential rows.

6. The anti-vibration mounting device of claim 1, wherein at least one of the pair of division walls adjoining the pressure receiving chamber and the balancing chamber includes the plurality of communication holes arranged circumferentially with respect to the center of the movable plate and a plurality of dents facing the accommodation room with one dent between each pair of circumferentially adjacent communication holes in the outer circumferential row.

7. The anti-vibration mounting device of claim 6, wherein the dents and the communication holes are alternately arranged at circumferentially equal intervals.

8. The anti-vibration mounting device of claim 6, wherein at least the outermost circumferential row of communication holes of the first one of the pair of division walls are arranged at specified circumferential intervals to have a total circumferential opening length shorter than the total circumferential length of non-opening sections on the same circumference, and each of the plurality of dents are disposed between a pair of circumferentially adjacent communication holes at least in the outermost circumferential row.

9. The anti-vibration mounting device of claim 8, wherein the communication holes in the first one of the pair of division walls are arranged in a radial pattern with respect to the center of the movable plate.

10. The anti-vibration mounting device of claim 6, wherein a rubber layer is formed on the surface of the first one of the pair of division walls facing the accommodation room and the plurality of dents are formed in the rubber layer.

11. The anti-vibration mounting device of claim 1, wherein the division wall adjoining the balancing chamber has a smaller total open area of the communication holes formed therein than the division wall adjoining the pressure receiving chamber.

12. The anti-vibration mounting device of claim 1, wherein at least the surface of the movable plate towards the balancing chamber has an annular ridge formed across the communication holes upon contact with the facing division wall.

13. The anti-vibration mounting device of claim 1, wherein at least the division wall adjoining the balancing chamber is provided at the surface facing the accommodation room with an annular region having no communication holes, and at least the surface of the movable plate towards the balancing chamber includes projections formed at circumferential intervals to correspond to the annular region.

* * * * *